United States Patent Office 3,640,880
Patented Feb. 8, 1972

3,640,880
HARD SURFACE CLEANER
John Robert Martin, Bebington, England, assignor to
Lever Brothers Company, New York, N.Y.
No Drawing. Filed Nov. 8, 1968, Ser. No. 774,537
Claims priority, application Great Britain, Dec. 6, 1967,
55,415/67
Int. Cl. C11d *1/12*
U.S. Cl. 252—555                                    9 Claims

ABSTRACT OF THE DISCLOSURE

A hard surface cleaning composition consisting essentially of a mixture of two olefin sulphonates, predominantly of 12 and 20 carbon chain length respectively, said mixture being the sole active or formulated in combination with anionic or nonionic surface active agents.

---

The invention relates to hard surface cleaners for use in the cleaning of, for example, by hand or machine, dishes, silverware, and cooking equipment or in the cleaning of walls and floors.

The function of hard surface cleaners is the removal of the soil deposited upon the hard surface without damage to the surface or hazard to the user. There are many varieties of soil, e.g. sooty soil, grease, oil etc., and the efficiency of a cleaner can be measured against a specific soil. However, since it is known that proteinaceous soil represents the most tenacious, i.e. the soil most difficult to remove, particularly from cooking equipment, the present invention is concerned with compositions which are effective in the removal of proteinaceous soil. Removal of this soil can be effected by ensuring that a cleaning composition in use has a relatively high buffered pH, of the order of 10 upwards. This method is undesirable in compositions the solutions of which, in use, necessarily come into contact with human skin, as in hand dishwashing. The present invention provides compositions which remove the tenacious proteinaceous soil whilst at a neutral pH, and thus minimise skin problems. The compositions are therefore of value in hand dishwashing. The proteinaceous soil selected for study is dried raw egg yolk—the kitchen soil which is known to present the most difficulty in removal. A removal test method for the determination of an index of performance of hard surface cleaning compositions has now been developed and is fully described later.

It has already been proposed to use alpha-olefin sulphonates as a detergent active in detergent compositions for use in many cleaning areas and including the dishwashing area. For dishwashing compositions, it has been proposed to use commercially available alpha-olefin sulphonates of carbon atoms totalling from 10–24, particularly of 16–18 carbons. It has also been proposed to use a commercially available broad cut alpha-olefin sulphonate of 15–18 carbon chain length. However, these compounds have been assessed hitherto only in respect of their foaming characteristics.

It has now been found, surprisingly, that a specific blend of two olefin sulphonates, viz, an olefin sulphonate having about 12 carbon atoms and an olefin sulphonate having about 20 carbon atoms, possesses the proteinaceous soil removal property to a synergistic degree. It has now been shown that an almost linear relationship between proteinaceous soil removal and the carbon chain length exists, for compositions of equal active or of equal molar basis, and that when the above mentioned sulphonates are used together, the performance in proteinaceous soil removal is superior to a surprising extent.

The olefin sulphonates may be pure compounds or the sulphonates produced from the commercially available narrow cut alpha-olefins known as the $C_{12}$ cut and the $C_{20}$ cut. These narrow cuts include at least 75% alpha-olefins having carbon chain length of the stated number, i.e. 12 or 20 carbon atoms respectively in the molecule. The remaining part of the cut will consist of the even numbered carbon chain adjacent to that stated, i.e. the $C_{12}$ cut will contain some $C_{10}$ and $C_{14}$, preferably $C_{10}$ dominant, and the $C_{20}$ cut will contain some $C_{18}$ and $C_{22}$ olefins, preferably $C_{18}$ dominant. It will be appreciated that the exact contents of the commercial cuts depend upon the manufacturing process employed and will therefore vary between suppliers. The synergistic property of the composition containing the above blend has been demonstrated using these cuts from several manufacturers/suppliers.

Not only is this property possessed by this blend to a degree surprising having regard to the other member of the olefin sulphonate series, but, the level is higher than that possessed by customary hard surface cleaners employing other actives.

The proteinaceous soil removal test involves determination of the rate of removal of a thin film (approx. 10 thou.) of dried (24 to 96 hours at 23° C.) raw egg yolk of known weight from a 3" x 1" glass plate while the plated is agitated by continuously dipping in an aqueous solution of the cleaning agent under test thermostatted at 45° C. The time taken to effect total removal (visually assessed) of the thin film is determined. The rate at which the dried egg yolk is removed by the solution of cleaning agent is compared with the rate of removal caused by a reference surfactant solution in order to product an Index of Performance. The use of a reference solution and a soiled plate of the same age of soil eliminates experimental error due to the changing nature with age, of the soil. The pH of solutions are adjusted where necessary to pH 7 e.g. with caustic soda or sulphuric acid. The reference surfactant is selected from known detergents e.g. nonylphenol-11 ethylene oxide condensate, alkyl aryl sulphonate, alkyl sulphate. Selection is governed by the length of time taken to achieve removal relative to the time taken by the solution under test.

The Index of Performance $$= \frac{\text{Rate of Removal by Sample}}{\text{Rate of Removal by Reference}} \times 10$$

The above test has been shown to correlate well with the performance of the cleaners in practical terms.

The substantially linear relationship between the index of performance and the carbon chain length of the olefin sulphonate is illustrated by the following Table I, in which sodium salts were used. The commercial materials are those from the hydrolysis/neutralisation of the products of sulphonation using $SO_3$/air of the commercial alpha-olefins of the stated cut.

TABLE I

| | Index of performance | | |
|---|---|---|---|
| | 0° Hardness | | |
| Sodium olefin sulphonate | 0.1% concn. a.d. | Molar olefin sulphonate, 0.003 m. | 24° Hardness, 0.1% a.d. |
| $C_{10}$ narrow cut, commercial | 71 | 65 | 53 |
| $C_{12}$ narrow cut, commercial | 59 | 49 | 49 |
| $C_{14}$ narrow cut, commercial | 44 | 42 | 30 |
| $C_{16}$ narrow cut, commercial | 41 | 41 | 27 |
| $C_{18}$ narrow cut, commercial | 33 | 35 | 19 |
| $C_{20}$ narrow cut, commercial | 31 | 34 | 12 |
| $C_{14-18}$ broad cut, commercial | 33/36 | | |
| $C_{15-18}$ broad cut, commercial | 38 | | |
| $C_{12}$ lab. prepared | 47 | | |
| $C_{14}$ lab. prepared | 40 | | |
| $C_{16}$ lab. prepared | 36 | | |

The synergistic proteinaceous soil removing performance of binary mixtures of the sodium olefin sulphonates having carbon chain lengths of about 12 and about 20 respectively, are demonstrated in Table 2.

TABLE 2

| | Indices of performance | | | | |
|---|---|---|---|---|---|
| Percent $C_{12}$ | 0 | 25 | 50 | 75 | 100 |
| Percent $C_{20}$ | 100 | 75 | 50 | 25 | 0 |
| Water Hardness: | | | | | |
| 4° H | 29 | 81 | 79 | 81 | 58 |
| 24° H | 12 | 44 | 70 | 65 | 49 |

The synergistic effect is demonstrated in the range 25% $C_{12}$, 75% $C_{20}$ to 75% $C_{12}$, 25% $C_{20}$. Although the Tables 1 and 2 concern the sodium salts, the olefin sulphonate may be used in the form of another alkali metal salt, salts of ammonia or organic nitrogen bases e.g. aliphatic, aromatic or heterocyclic amines such as mono, di or trimethyl, -ethyl, -lauryl, -ethanol, -propanol, -butanol, -hexanol, cyclo hexyl, phenyl pyridyl or morpholinyl-amines or heterocyclic nitrogen bases such as piperidine, pyridine or morpholine.

The results in Table 2 demonstrate also the superiority of the performance of these blends of olefin sulphonates, over the conventional hard surface cleaning agent, sodium dodecylbenzene sulphonate, which, at the same level of active and in the same test, gives values of 29 and 17 at 4° H and 24° H respectively. The blends are also superior, at the same active level, to (a) a commercial broad cut $C_{14-18}$ alpha-olefin sulphonate which gives 36 and 18 respectively, and (b) a commercial broad cut $C_{15-18}$ alpha-olefin sulphonate which gives 38 and 15 respectively.

The foaming properties of the binary mixtures which exhibit synergistic proteinaceous soil removal have been examined. A 50/50 binary mixture of the narrow cut $C_{12}$ and $C_{20}$ olefin sodium sulphonates exhibit little foam and are thus very suitable as low foam producing hard surface cleaning compounds i.e. for use in machine dishwashing products, floor and wall cleaners. In these uses high foaming is disadvantageous. Foaming properties may be obtained by including in the compositions, known lather inducers and/or boosters.

The proteinaceous soil removing properties in hard water may be improved by the inclusion of a chelating or sequestering agent in the composition, e.g. an amino carboxylic acid or a salt thereof, e.g. glycine, nitrilotriacetic acid ethylene diamine tetra acetic acid, diethylene triamine penta acetic acid; a hydroxyaminocarboxylic acid, such as hydroxyethyl ethylene diamine tetra acetic acid, dihydroxy ethyl glycine; a hydroxycarboxylic acid or a salt thereof, e.g. hydroxyacetic, oxalic, lactic, citric, tartaric, gluconic, or heptonic acid. However, the binary mixture of the invention in the absence of sequestering agents exhibits an unusually high resistance to water hardness. This is demonstrated in Examples 3–5 and their comparative.

The binary olefin sulphonate mixture of this invention may be used in conjunction with one or more of the surfactants usual in the hard surface cleaning art, for the purpose of achieving detergency, other than proteinaceous soil removal, or for the control of amount and type of lather, or for wetting, for example, such as alkane sulphonates, alkyl sulphates, sulphonates, phosphates and carboxylates, alkyl aryl sulphonates and phosphates, alkyl polyoxyethylene sulphates, phosphates and carboxylates, alkyl aryl polyoxyethylene sulphates and phosphates, alkyl carboxylate sulphonates and their esters, sucrose esters, taurides, sarcosides, sulpho succinates, alkyl succinates, amine oxides, substituted mono and diethanolamides, propanolamide and isopropanolamide, sulphates of substituted mono and diethanolamide, propanolamide and isopropanolamide, alkyl betaines, sulphobetaines, N-alkyl imino dipropionates, N-alkyl amino propionate, isothionate esters, monoglyceride sulphates, polyethoxylated acids, alcohols, phenols and amides.

Lather improvement can be achieved readily by inclusion of one or more of the above mentioned synthetic detergents, in particular, an alkyl aryl sulphonate preferably sodium dodecyl benzene sulphonate, an alkyl ether sulphate preferably sodium lauryl ether (3EO) sulphate, and a hydroxy alkyl methyl tauride. Coconut monoethanolamide is usually included as this material is a customary lather booster or stabiliser. Such compositions have a substantially similar performance in lather volumes to compositions of the same level of active in which the olefin sulphonate blend of the present invention is replaced by conventional anionic synthetic detergents, for example a 1:1 mixture of sodium dodecyl benzene sulphonate and sodium lauryl ether (3EO) sulphate.

Where compositions having low lather properties are desired, the olefin sulphonate blend of the present invention can be used in conjunction with a low foaming nonionic surface active agent.

Also included in the compositions may be dyes, perfumes, germicides, bacteriostats, opacifiers, viscosity modifiers and/or hydrotropes.

The hard surface cleaning compositions of the present invention contain, as an essential feature, a binary mixture of $C_{12}$ and $C_{20}$ olefin sulphonate, preferably in the weight ratio of between 1:3 and 3:1. For use in floor cleaning, compositions having 1–5% a.d. may be used at a concentration of 10 gms. of composition per litre of water. It will be understood that compositions intended for floor cleaning usually contain only 1–5% active detergent, as they rely for their cleaning properties on a high alkalinity of solution. Because these compositions are usually applied from aqueous solution by a mop, there is no real hazard to hands and skin of the user from the high alkalinity. This high alkalinity is achieved by the presence of builders such as salts of condensed phosphoric acid, and salts of condensed silicates. The proteinaceous soil removal property obtained from the olefin sulphonate binary mixture of this invention, is thus of less importance than in the hard surface cleaning compositions which are intended for dishwashing. Typical floor cleaning compositions using the binary mixture include for example, 25% sodium tripolyphosphate, 15% trisodium phosphate, 10% chlorinated trisodium phosphate, 40–50% sodium sesquicarbonate.

A typical liquid composition for handwashing of dishes would include from about 10–60% total active detergent matter, the remainder being additives for example pyrophosphates, carbonates, sulphates, chlorides, which are not detrimental to skin as well as those above-discussed, e.g. hydrotrope, viscosity modifier, made up to the required active level with water.

Machine dishwashing compositions are usually less high in active content that handwashing compositions, because they can be formulated to a higher alkalinity level. Little hand contact is concerned in their use and formulators need consider in addition, to efficient cleansing, only the effects on the goods to be washed. In use, in a machine dishwasher, the concentration of composition of 5% a.d. type would be of the order of 2–6 gms. composition per litre of water.

The invention will now be described by way of illustrative examples, in which the amounts of the ingredients are on the basis of 100%, a.d. where appropriate. The compositions of Examples 1–15 are hand dishwashing liquids, Examples 16 and 17 are machine dishwashing powders, and Example 18 is a hard surface cleaning liquid.

| Example number | 1 | 2 | Comparatives | | |
|---|---|---|---|---|---|
| Percent by weight: | | | | | |
| Sodium olefin (C12) sulphonate (comml.) | 9 | 13 | | 18 | |
| Sodium olefin (C20) sulphonate (comml.) | 9 | 5 | | | |
| Sodium olefin (C15-20) sulphonate (comml.) | | | 18 | | |
| Sodium dodecyl benzene sulphonate | | | | | 18 |
| Coconut monoethanolamide | 4 | 4 | 4 | 4 | 4 |
| Lauryl 3 polyethylene oxide sulphate (Na salt) | 18 | 18 | 18 | 18 | 18 |
| Ethyl alcohol, percent | 8 | 8 | 8 | 8 | 8 |
| Xylene sulphonate (Na salt), percent | 5 | 5 | 5 | 5 | 5 |
| Water | | | to 100% | | |
| Index of performance (0.1% a.d., 12° H., 45° C.) | 59 | 62 | 34 | 52 | 44 |

EXAMPLES 3-5

| | 3 | 4 | 5 | Comparative |
|---|---|---|---|---|
| Sodium olefin (C12) sulphonate (commercial) | 12.5 | 12.5 | 12.5 | |
| Sodium olefin (C20) sulphonate (commercial) | 12.5 | 12.5 | 12.5 | |
| Sodium lauryl 3-polyethylene oxide sulphate | 10 | 12.5 | 15 | 18 |
| Sodium dodecyl benzene sulphonate | | | | 18 |
| Coconut monoethanolamide | 5 | 2.5 | | 4 |
| Ethyl alcohol | 10 | 10 | 10 | |
| Hydrotrope and water | | | to 100 | |
| Index of performance: | | | | |
| 0.1% a.d., 0° H., 45° C | 75 | 65 | 64 | 46 |
| 0.1% a.d., 24° H., 45° C | 60 | 50 | 52 | 15 |

EXAMPLE 6

| Percent by weight: | |
|---|---|
| Sodium olefin (C12) sulphonate (comml.) | 20 |
| Sodium olefin (C20) sulphonate (comml.) | 10 |
| Coconut fatty acid amide 5-6 ethylene oxide | 10 |
| Ethyl alcohol, percent | 8 |
| Xylene sulphonate (Na salt), percent | 5 |
| Water (percent) to | 100 |
| Index of performance (0.1% a.d., 12° H., 45° C.) | 60 |

EXAMPLES 7-9

| | 7 | 8 | 9 |
|---|---|---|---|
| Sodium olefin (C12) sulphonate (commercial) | 7.5 | 12.5 | 15 |
| Sodium olefin (C20) sulphonate (commercial) | 7.5 | 12.5 | 15 |
| Sodium dodecyl benzene sulphonate | 22.5 | 12.5 | 7.5 |
| Coconut monoethanolamide | 2.5 | 2.5 | 2.5 |
| Ethyl alcohol | 10 | 10 | 10 |
| Hydrotrope and water | | to 100 | |
| Index of performance: | | | |
| 0.1% a.d., 0° H., 45° C | 64 | 66 | 79 |
| 0.1% a.d., 24° H., 45° C | 25 | 56 | 59 |

Examples 10-12

| | 10 | 11 | 12 |
|---|---|---|---|
| Sodium olefin (C12) sulphonate (commercial) | 10 | 12.5 | 12.5 |
| Sodium olefin (C20) sulphonate (commercial) | 10 | 12.5 | 12.5 |
| Sodium hydroxy alkyl (C12-16) methyl tauride | 10 | 5 | 10 |
| Octyl phenol —11.5 ethylene oxide condensate | 10 | 10 | 5 |
| Ethyl alcohol | 10 | 10 | 10 |
| Hydrotrope and water | | to 100 | |
| Index of performance: | | | |
| 0.1% a.d., 0° H., 45° C | 78 | 62 | 73 |
| 0.1% a.d., 24° H., 45° C | 53 | 40 | 40 |

EXAMPLE 13

| | |
|---|---|
| Sodium olefin (C12) sulphonate (commercial) | 12.5 |
| Sodium olefin (C20) sulphonate (commercial) | 12.5 |
| Coconut fatty acid amide —5.6 ethylene oxide condensate | 2.5 |
| Sodium lauryl 3-polyoxyethylene sulphate | 12.5 |
| Ethyl alcohol | 10 |
| Hydrotrope and water to | 100 |
| Index of performance: | |
| 0.1% a.d., 0° H., 45° C | 66 |
| 0.1% a.d., 24° H., 45° C | 57 |

EXAMPLE 14

| | |
|---|---|
| Sodium olefin (C12) sulphonate (commercial) | 12.5 |
| Sodium olefin (C20) sulphonate (commercial) | 12.5 |
| Sodium lauryl 3-polyoxyethylene sulphate | 10 |
| Octyl phenol —11.5 ethylene oxide condensate | 5 |
| Ethyl alcohol | 10 |
| Hydrotrope and water to | 100 |
| Index of performance: | |
| 0.1% a.d., 0° H., 45° C | 58 |
| 0.1% a.d., 24° H., 45° C | 47 |

EXAMPLE 15

| Percent by weight: | |
|---|---|
| Sodium olefin (C12) sulphonate (comml.) | 9 |
| Sodium olefin (C20) sulphonate (comml.) | 5 |
| Coconut monoethanolamide | 3 |
| Lauryl 3 polyoxyethylene sulphate (sodium salt) | 8 |
| Ethyl alcohol | 8 |
| Sodium xylene sulphonate | 5 |
| Water (percent) to | 100 |
| Index of performance (0.1% a.d., 12° H., 45° C.) | 60 |

EXAMPLES 16 AND 17.—MACHINE DISHWASHING POWDERS

| | 16 | 17 |
|---|---|---|
| Percent by weight: | | |
| Sodium olefin (C12) sulphonate (comml.) | 2 | 16 |
| Sodium olefin (C20) sulphonate (comml.) | 2 | 9 |
| Sodium tripolyphosphate | 50 | 30 |
| Sodium metasilicate | 25 | 15 |
| Sodium sesquicarbonate | 5 | |
| Chlorinated trisodium phosphate | 15 | 10 |
| Sodium chloride | | 20 |
| Index of performance (0.1% a.d., 12° H., 45° C.) | 95 | 101 |

EXAMPLE 18.—HARD SURFACE CLEANER

| | |
|---|---|
| Sodium olefin (C12) sulphonate (comml.) | 12.5 |
| Sodium olefin (C20) sulphonate (comml.) | 12.5 |
| Octyl phenol —11.5 ethylene oxide condensate | 15 |
| Index of performance: | |
| 0.1% a.d., 8° H., 45° C | 75 |
| 0.1% a.d., 24° H., 45° C | 70 |

What is claimed is:

1. A hard surface cleaning composition comprising from about 1% to about 60% by weight of said composition of a detergent material consisting essentially of a mixture of a first olefin sulphonate in which at least 75% of the carbon chains have 12 carbon atoms, and a second olefin sulphonate in which at least 75% of the carbon chains have 20 carbon atoms, said sulphonates being present in a weight ratio of about 1:3 to about 3:1, and an agent selected from the group consisting of anionic and nonionic surface active agents and mixtures thereof.

2. A cleaning composition comprising a mixture of a first olefin sulfonate in which at least 75% of the carbon chains have 12 carbon atoms and a second olefin sulfonate in which at least 75% of the carbon chains have 20 carbon atoms in a weight ratio of 1:3 to 3:1.

3. The composition of claim 1 wherein the active detergent material is a mixture of a nonionic surface active agent and said olefin sulphonates.

4. The composition of claim 1 wherein the active detergent material is a mixture of an anionic surface active agent and said olefin sulphonates.

5. A composition of claim 1 wherein said sulphonates are sodium olefin sulphonates.

6. A composition of claim 2 wherein said sulphonates are sodium olefin sulphonates.

7. A composition of claim 3 wherein said sulphonates are sodium olefin sulphonates.

8. A floor cleaning composition which comprises from about 1% to about 5% by weight of said composition of a detergent material consisting essentially of a mixture of a first olefin sulphonate in which at least 75% of the carbon chains have 12 carbon atoms, and a second olefin sulphonate in which at least 75% of the carbon chains have 20 carbon atoms, said sulphonates being present in a weight ratio of about 1:3 to about 3:1 and a nonionic surface active agent.

9. A hand dishwashing composition which comprises from about 10% to about 60% by weight of said composition of a detergent material consisting essentially of a mixture of a first olefin sulphonate in which at least 75% of the carbon chains have 12 carbon atoms, and a second olefin sulphonate in which at least 75% of the carbon chains have 20 carbon atoms, said sulphonates being presetn in a weight ratio of about 1:3 to about 3:1, an agent selected from the group consisting of anionic and nonionic surface active agents and mixtures thereof.

References Cited
UNITED STATES PATENTS

| | | | |
|---|---|---|---|
| 2,949,425 | 8/1960 | Vitale et al. | 252—161 |
| 3,214,462 | 10/1965 | Swenson et al. | 252—161 |
| 3,332,880 | 7/1967 | Kessler et al. | 252—161 |
| 3,376,336 | 4/1968 | Stein et al. | 260—513 |

LEON D. ROSDOL, Primary Examiner

W. E. SCHULZ, Assistant Examiner

U.S. Cl. X.R.

252—138, 545